United States Patent [19]

Trotter

[11] 3,918,509

[45] Nov. 11, 1975

[54] TIRE CHANGING APPARATUS

[76] Inventor: Robert Michale Trotter, 1969 Fifth St., Chamblee, Ga. 30341

[22] Filed: June 26, 1974

[21] Appl. No.: 483,158

[52] U.S. Cl. ............ 157/1.24; 157/1.22; 144/288 A
[51] Int. Cl.² .................... B60C 25/02; B60C 25/06
[58] Field of Search.................... 157/1.22, 1.24, 1.3; 144/288 A; 248/165, 223, 317, 342–344

[56] References Cited
UNITED STATES PATENTS

| | | | |
|---|---|---|---|
| 1,122,599 | 12/1914 | Johnson | 157/1.3 |
| 2,273,340 | 2/1942 | Van Zale | 157/1.22 |
| 2,311,789 | 2/1943 | Taylor | 157/1.3 |
| 3,130,949 | 4/1964 | Erhardt | 248/343 |
| 3,164,197 | 1/1965 | Bishman et al. | 157/1.3 |
| 3,191,657 | 6/1965 | Lund | 157/1.24 |
| 3,247,883 | 4/1966 | Strang et al. | 157/1.22 |
| 3,589,660 | 6/1971 | Dunckel | 248/343 |
| 3,771,581 | 11/1973 | Johnson | 157/1.22 |
| 3,789,894 | 2/1974 | Adams | 157/1.22 |

*Primary Examiner*—Al Lawrence Smith
*Assistant Examiner*—Harold P. Smith, Jr.
*Attorney, Agent, or Firm*—Jones, Thomas & Askew

[57] ABSTRACT

Apparatus for mounting and dismounting tires on the rims of spoked wheels includes a stand having an annular support in a horizontal plane on which the spoked wheel rests, and a plurality of spoke engaging members extending upwardly from the annular support through the spokes of the wheels to prevent the wheels from turning with respect to the support. A lever includes a tire mounting tool at one end and a tire dismounting tool at the other end, and a brace is pivotally connectable to the lever adjacent either of its ends. The lever is bent at an angle adjacent each of its ends, and the tools at the ends of the lever can be applied to the tire while the brace is applied to the rim to provide the proper leverage when mounting or dismounting the tire with respect to the rim.

9 Claims, 5 Drawing Figures

TIRE CHANGING APPARATUS

BACKGROUND OF THE INVENTION

Mounting and dismounting pneumatic tires from rigid rims has always been onerous because of the tight fit the bead of the tire makes with the rim in order to have the tire properly fit on the rim. In the case of motorcycle wheels where the tires are relatively small and tough, the tires are even more difficult to mount and dismount with respect to the rims. Since motorcycle wheels come in various sizes, and since the typical automobile service station has equipment suitable primarily for changing automobile tires and rarely has equipment suitable for changing motorcycle tires, it is particularly onerous and inconvenient to change motorcycle tires.

SUMMARY OF THE INVENTION

Briefly described, the present invention comprises apparatus for mounting and dismounting tires with respect to motorcycle wheels, and includes a stand which has a support ring oriented in a horizontal attitude and a plurality of projections extending upwardly from and spaced about the support ring, so that a motorcycle wheel which has spokes extending from a hub outwardly to a metal rim can be placed on the support rings, with the upwardly extending projections protruding into the spokes of the wheel to prevent the wheel from rotating with respect to the support ring. A lever includes a tire mounting tool at one end and a tire dismounting tool at the other end, and a brace is pivotably connected to the lever adjacent either of its ends. The lever is bent adjacent its ends so that the brace can be applied to the rim of the wheel closely adjacent the position where the tool is inserted between the rim and the tire to provide optimum leverage for the purpose of mounting or dismounting the tire with respect to the rim.

Thus, it is an object of the present invention to provide apparatus for changing motorcycle tires or the like which is inexpensive to produce, expedient to use and which provides the worker with optimum leverage during the tire changing process.

Other objects, features and advantages of the present invention will become apparent upon reading the following specification, when taken in conjunction with the accompanying drawing.

DETAILED DESCRIPTION

Figure 1:
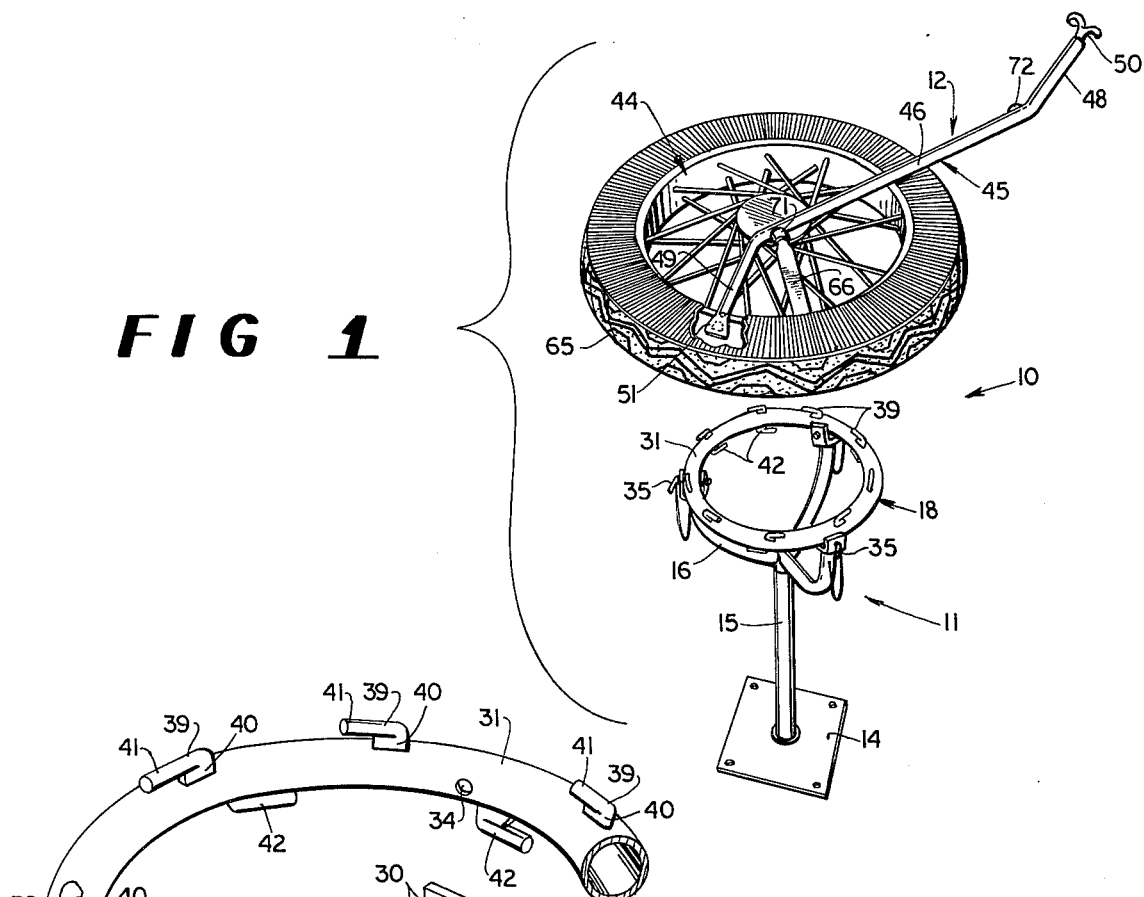
FIG. 1 is an exploded perspective view of the wheel support stand, wheel with a tire mounted thereon suspended above the support stand, and the tire changing tool applied to the tire and wheel. A portion of the tire is broken away for the purpose of showing the tire dismounting tool.

Referring now in more detail to the drawing, in which like numerals indicate like parts throughout the several views, FIG. 1 illustrates apparatus 10 for mounting and dismounting tires which includes a wheel support stand 11 and a tire changing tool 12. The wheel support stand 11 comprises base 14, upright stanchion 15, support spider 16 and a wheel support ring 18. Base 14 can be of any shape and is usually bolted to a concrete floor or to some other rigid support. Stanchion 15 is rigidly connected to base 14 and extends vertically upwardly therefrom. The lower end of stanchion 15 is shown as being permanently connected to base 14, however, a separable connection can be formed, if desired, by a threaded socket connection or by other conventional connecting means (not shown).

Figure 2:
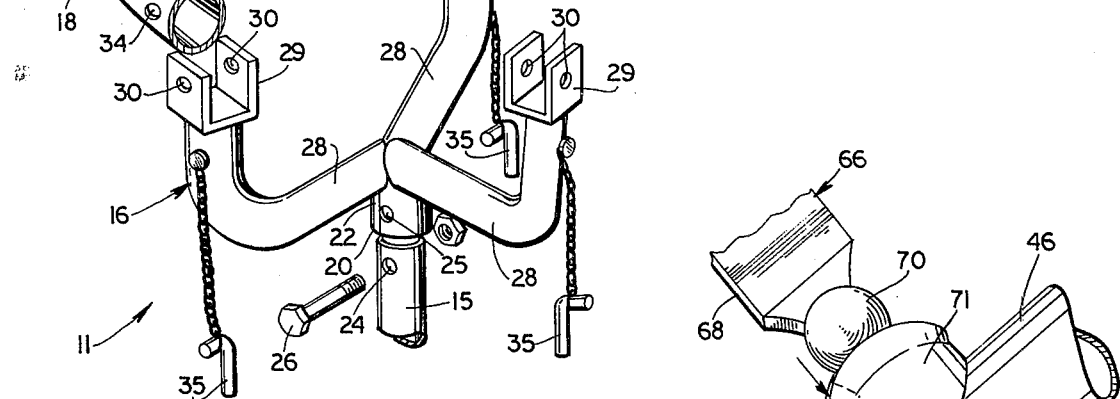
FIG. 2 is an exploded perspective detail of the upper portion of the wheel support stand.

As is illustrated in FIG. 2, support spider 16 includes a central cap 20 with an annular depending flange 22. The upper portion of stanchion 15 has aligned horizontal openings 24 extending therethrough, and the flange 22 of cap 20 has aligned openings 25. The cap is insertable over the upper end of stanchion 15 and the openings 24 and 25 are alignable with each other and bolt 26 is extended through the openings 24 and 25 to anchor the cap 20 on stanchion 15. A plurality of spider support arms 28 radiate outwardly at 120° intervals in a horizontal plane from cap 20 and then curve upwardly with the base of each arm 28 being welded to the flange 22 of cap 20, and the distal upper end 29 of each arm is formed in a clevis with aligned apertures 30.

Wheel support 18 includes annular ring 31 of tubular cross section arranged to rest on spider 16 in a horizontal attitude. Apertures 34 are formed through the support ring at intervals therearound which correspond to the spacing of the spider arms 28, so that the apertures 30 of each clevis 29 formed at the upwardly extending distal end of each spider arm is alignable with the apertures of the support ring. Connecting pins 35 are connected to each spider arm by a tether and are insertable into the aligned apertures 30 and 34 of the clevises 29 and the annular ring 31. When the support ring is inserted on spider 16 so that the upwardly clevises extend about the apertures 34 of the support ring, the apertures 30 of each clevis will be in approximate alignment with the apertures 34 of the support ring and connecting pins 35 are inserted through the aligned apertures 30 and 34, to anchor the support ring 31 to the spider 16. Since the clevises 29 of spider arms 28 and apertures 34 of support ring 31 are equally spaced about the support ring, support ring 31 can be turned over and mounted on spider 16.

A plurality of L-shaped fingers or hooks 39 are rigidly connected to the upper surface of support ring 31 and are equally spaced about the support ring. Each hook includes an upright section 40 extending upwardly from the support ring and a horizontal section 41 extending approximately in the same tangential direction about the support ring. A second plurality of L-shaped fingers or hooks 42 extend from the lower surface of support ring 31 and are equally spaced about the support ring, each having a vertical section and a horizontal section, with each horizontal section extending in the same tangential direction about the support ring.

The number of hooks 39 on the upper surface of support ring 31 is different from the number of hooks 42 on the lower surface of the support ring so that motorcycle wheels having different numbers of spokes can be securely supported by support stand 11. For example, some motorcycle wheels have 36 spokes while other motorcycle wheels have 40 spokes. The upper surface of support ring 31 has nine hooks 39 properly spaced so that the motorcycle wheels having thirty-six spokes can be securely held by the support stand 11. Ten hooks 42 are present on the lower surface of support ring 31 and the spacing of the hooks 42 is arranged to accommodate the 40 spoke motorcycle wheel.

When a motorcycle wheel 44 is mounted on the wheel support stand, the wheel is oriented to a horizontal attitude as illustrated in FIG. 1 and is placed on the support ring 31. The hooks 39 or 42 extend upwardly into the spokes of the wheel and therefore function as spoke-engaging means to limit the rotation of the wheel with respect to the support ring 31. The horizontal section 41 of each hook 39 and 42 keeps the wheel from lifting off the support ring while the upright section 40 of each hook keeps the wheel from rotating with respect to the support ring.

The recessed relationship of the upper portion of stanchion 15 and the central portion of support spider 16 with respect to support ring 31 is such that these elements will not interfere with the center portion or hub of the wheel which may include the chain sprocket, axle, etc., and the wheel will be supported by its spokes on support ring 31.

As illustrated in FIG. 1, tire changing tool 12 comprises a lever 45 having a middle section 46 and end sections 48 and 49. Both end sections 48 and 49 are disposed at an angle with respect to the middle section 46. While the angle may vary, it is anticipated that the end sections 48 and 49 will be disposed at approximately a 45° angle with respect to the middle section, the purpose of which will be made more clear hereinafter. A tire mounting tool 50 is formed at one end of lever 45 and a tire dismounting tool 51 is formed at the opposite end of the lever. Brace 66 is detachably connected to the lever 45 adjacent either of its ends. Middle section 46 and end sections 48 and 49 of lever 45 are disposed in a common plane and brace 66 is arranged to pivot with respect to lever 45.

Figure 3:
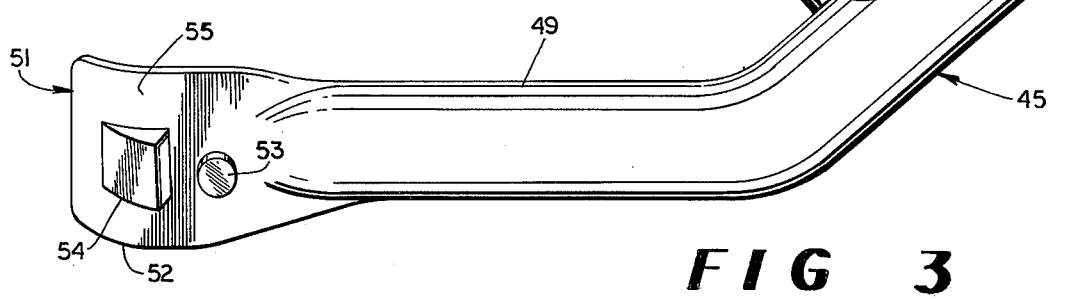
FIG. 3 is a detail illustration of the tire dismounting tool.

As is best illustrated in FIG. 3, tire dismounting tool 51 which is formed on one end of lever 45 comprises a curved spade 52, an anti-friction bearing button 53 and a protrusion 54. The spade 52 is curved in a plane normal to the plane in which lever 45 lies, and includes a convex surface 55 and a concave surface (not shown) on the opposite side of the convex surface. Protrusion 54 slopes upwardly from the convex surface of spade 52. The protrusion is substantially merged with the convex surface of spade 52 and slopes upwardly toward the middle section 46 of the lever, so as to present an abrupt surface 56. Bearing button 53 is fabricated from nylon or other material which is durable and which provides a suitable, relatively frictionless surface.

Figure 4:
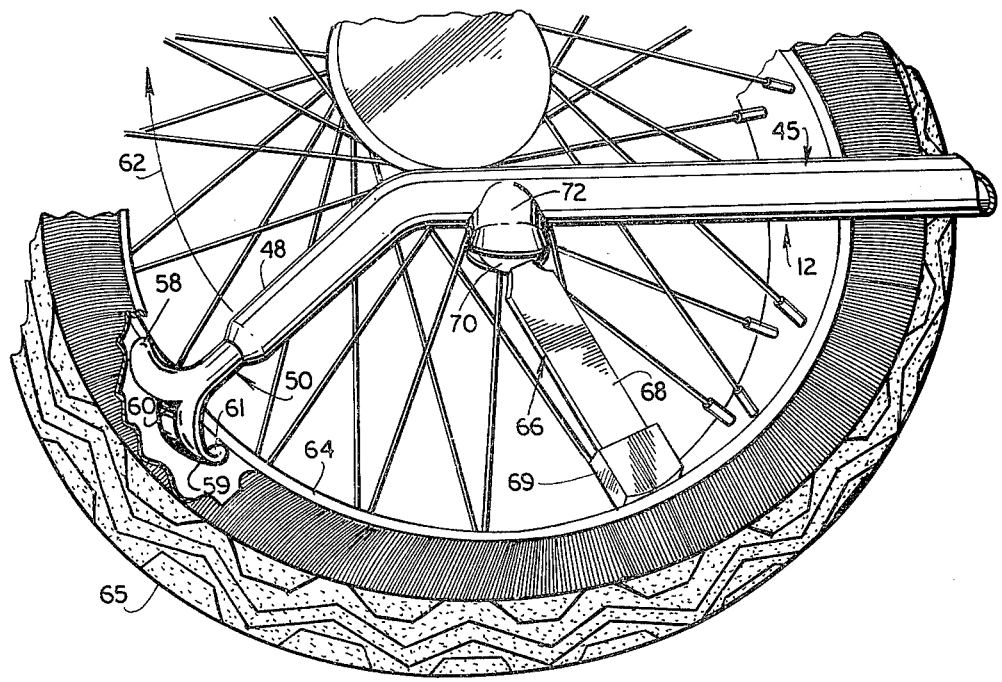
FIG. 4 is a detail illustration of the tire mounting tool as it is applied to the tire and the rim of the wheel.

As is illustrated in FIG. 4, the tire mounting tool 50 located at the opposite end of lever 45 includes a pair of guides 58 and 59 which slope outwardly from the longitudinal axis of the end section 48 of the lever. The guides 58 and 59 define a groove 60 therebetween, and guide 59 includes a bent edge 61 that functions as a hook. When the tire mounting tool 50 is moved in the direction indicated by arrow 62, hook 61 is located behind guide 58 and the groove 60 formed between guides 58 and 59. The groove 60 is sloped outwardly with respect to end section 48 of lever 45 in the direction opposite to the normal direction of movement of the lever as indicated by arrow 62, and downwardly with respect to the rim 64 and tire 65.

Figure 5:
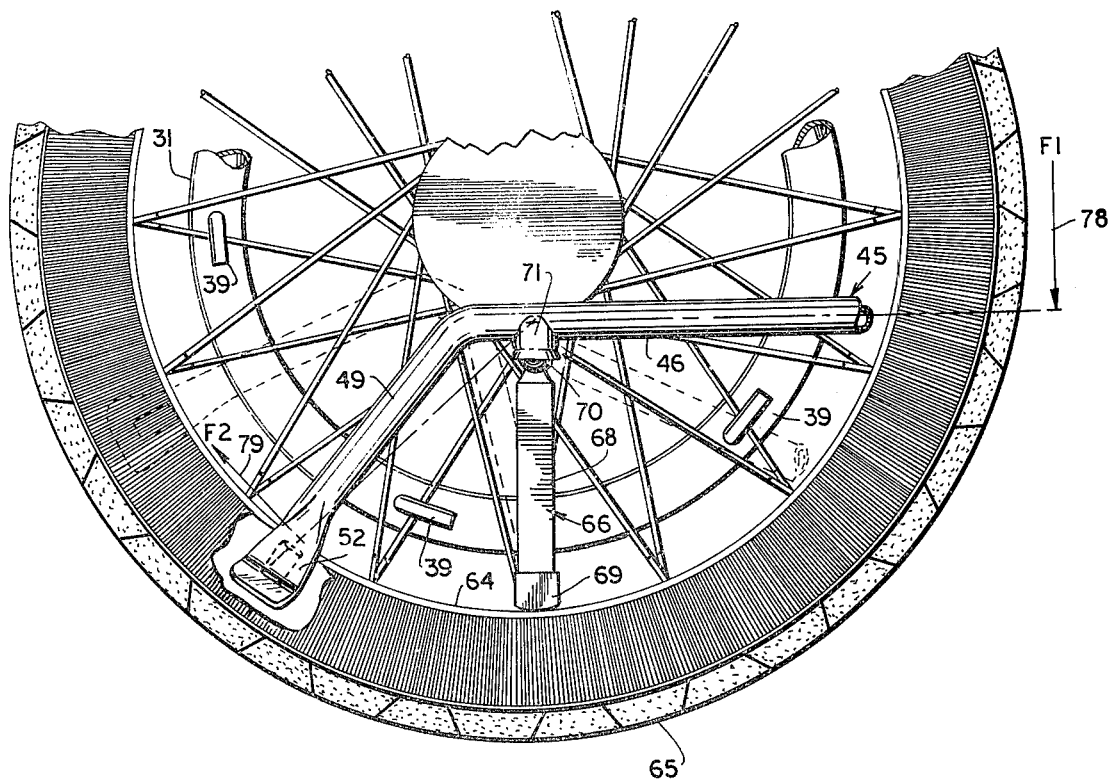
FIG. 5 is a detail illustration of the tire dismounting tool and the brace as they are applied to the tire and the rim of the wheel.

As is best illustrated in FIGS. 3 and 5, brace 66 comprises a rectilinear strap 68 covered at one end with a rubber tip 69 and having rigidly connected thereto at its other end a connecting ball 70. Lever 45 includes sockets 71 and 72 facing the included angles between the middle section 46 and end sections 48 and 49. Ball 70 of brace 66 is insertable with a friction or snap fit into either of the sockets 71 or 72. Thus, brace 66 is pivotal about its ball 70 in the sockets to a multiple number of attitudes.

OPERATION

When the tire changing apparatus is placed in use, the support ring 31 of the wheel support stand 11 is positioned with the proper side facing in an upward direction to accommodate the wheel. For example, if a wheel having thirty-six spokes therein is to be mounted on wheel support stand 11, the side of support ring 31 having the proper number of spoke engaging means 39 or 42 would be placed so that it is facing in an upward direction. The support ring 31 is moved down into the three clevises 29 with the apertures 34 of the support ring aligned with the apertures 30 of the clevises, and the connecting pins 35 are inserted through the aligned apertures. A wheel 44 is then placed on the support ring, and the spoke engaging means 39 or 42 extend upwardly into the spokes of the wheel. The spoke engaging means hold the wheel from rotating with respect to the support ring 31 and keep the wheel from lifting up off the support ring.

When a tire 65 is to be removed from a rim 64 of a wheel, the tire dismounting tool 51 on the lever 45 is inserted between the rim 64 and the bead of the tire, with the concave surface of the spade 52 facing the tire and the convex surface 55 facing the rim. When the protrusion 54 on the convex surface 55 of the spade 52 is inserted inside the rim 64, the lever is then pivoted over the wheel so that it lies approximately parallel to the wheel, which causes the spade to pivot about the rim and lift the bead of the tire up with respect to the rim. The protrusion 54 is easily insertable with the spade 52 into the tire because of the sloped surface of the protrusion facing the end of the spade, and once the protrusion is located inside the rim 64 and the lever is pivoted over the tire as previously described, the abrupt rear surface 56 of the protrusion facing away from the end of the spade rides against the rim and tends to keep the spade 52 from slipping out of the tire. Bearing button 53 bears against the upper surface of the rim.

Once the spade 52 has been properly inserted into the tire, the brace 66 is connected to the lever by snapping ball 70 of brace 66 into socket joint 71.

As is illustrated in FIG. 5, the distal end of brace 66 is applied to the inside or concave portion of rim 64. The angle which the end section 49 makes with the middle section 46 of lever 45 is approximately 45°, and the brace 66 is located in the included angle so that the end section 49 of the lever is positioned relatively close to the distal end of the brace 66 which bears against the rim 64. The operator then applies a force F1 indicated by the arrow 78 on the free end of lever 45. The ball and socket joint functions as a moving fulcrum, and the force F2 moves spade 52 as indicated by arrow 79. As the spade 52 moves in the direction of arrow 79, the free end of brace 66 remains in abutment with the rim 64 and does not tend to slide with respect to the rim because of the rubber tip 69 and the ball and socket joint tends to rotate about the point of engagement of the distal end of the brace 66 with respect to the rim, as illustrated in dashed lines in FIG. 5. In the meantime, spade 52 moves about the rim as shown by its dashed line position and the free end of the lever moves to its dashed line position. As the spade 52 moves as described above, the tire 65 is progressively separated from rim 64, and the brace 66 is repositioned by the operator as necessary in order to regain the mechanical advantage, and the spade 52 continually progresses about the tire and rim to complete the separation of the tire from the rim. After the upper bead of the tire has been separated with this procedure, the spade is reinserted between the rim 64 and the lower bead of the tire and the process is repeated to completely remove the tire from the rim.

When a tire is to be mounted on a rim, the opposite end of the tire changing tool 12 is used. The bead of the tire is inserted in the groove 60 of the tire mounting tool, and the hook 61 is inserted over the rim 64. The groove is angled so that it tends to guide the bead of the tire from above the rim down and about the rim so as to seat the bead of the tire on the rim. Again, brace 66 is positioned adjacent the tire mounting tool 50 in the aperture provided adjacent the intersection of the middle section 46 and the end section 48, and the free end of brace 66 is applied to the rim of the wheel as the tire mounting tool is applied to the tire in a progressive sequence of movements about the wheel to mount the tire on the wheel.

The angled relationship between the end sections 48 and 49 with respect to the middle section 46 of the lever provides the worker with a mechanical advantage that enables him to mount and dismount even the most difficult tires. The length of brace 66 is relatively short and the length of the end sections 48 and 49 is also relatively short so that the distance from the fulcrum of the ball and socket point to the edge of the rim 64 where the tire mounting or dismounting tool is applied is relatively short, while the free end of lever 45 is relatively long. This provides a mechanical advantage to the operator so as to multiply the force he applies to the lever. In addition, the placement of the free end of the brace 66 is close to the location where the tire mounting or dismounting tool is applied to the tire, and this appears to increase the mechanical advantage provided to the worker. Since the fulcrum or ball and socket joint moves as the dismounting or mounting tool progresses about the rim of the wheel, the size of the wheel is not critical and the apparatus can be used with wheels of virtually any size.

While this invention has been described in detail with particular reference to preferred embodiments thereof, it will be understood that variations and modifications can be effected within the spirit and scope of the invention as described hereinbefore and as defined in the appended claims.

I claim:

1. Apparatus for mounting and dismounting tires on a spoked wheel including a base, a stanchion extending upwardly from said base, a support ring removably mounted on said stanchion in a horizontal attitude whereby said support ring can be inverted with respect to said stanchion, and a plurality of spoke engaging means positioned about the support ring and extending upwardly from the upper surface of said support ring and downwardly from the lower surface of said support ring, whereby a wheel having spokes therein is placed in a horizontal attitude on the support ring and the spoke engaging means protrude upwardly from the support ring into the spokes of the wheel and prevent the wheel from rotating with respect to the support ring.

2. The apparatus of claim 1 and further including a lever comprising an approximately rectilinear middle section and end sections each disposed at an angle with respect to the middle section, a tire dismounting tool at one end of said lever and a tire mounting tool at the other end of the lever, and a brace removably pivotally connected to lever at positions adjacent the interior of the angles of said lever, whereby the lever is positioned in an approximately horizontal attitude above the wheel and the tire is engaged by either the tire mounting tool or the tire dismounting tool and the distal end of the brace is applied to the rim of the wheel.

3. Apparatus for mounting and dismounting tires on wheels comprising support means for fixedly holding a wheel in a horizontal attitude, a lever comprising an approximately rectilinear middle portion and end portions disposed at an angle with respect to the middle portion, a tire mounting tool at one end of the lever and a tire dismounting tool at the other end of the lever, a brace pivotally mounted at one of its ends on the lever in the included angle adjacent the intersection of the middle portion and one of the end portions of the lever, said brace being pivotally connected to the lever and movable in a plane approximately parallel to the plane in which the middle portion of the lever is present, and the distal end of said brace including a covering of high friction material, whereby the distal end of the brace is applied to the rim of the wheel and the tool at the end of the lever adjacent the brace is applied to the tire.

4. The apparatus of claim 3 and wherein said brace includes a ball at one end and said lever includes a socket to receive said ball, whereby said brace and said lever are pivotable with respect to each other about said ball and socket.

5. The apparatus of claim 3 and wherein said tire dismounting tool comprises a spade curved in a plane normal to the plane of the middle portion of the lever and the end portion of the lever that includes the tire dismounting tool, and a protrusion positioned on the convex surface of the spade, whereby the spade is inserted in the tire on the wheel between the rim of the wheel and the tire with the concave surface of the spade facing the tire, the lever pivoted about the rim until it lies approximately flat against the wheel with the protrusion located beyond the rim.

6. Apparatus for mounting and dismounting tires on wheels comprising a lever including a tire mounting tool at one end and a tire dismounting tool at the other end, a brace removably connectable to the lever adjacent either of the ends of the lever, said brace being pivotably connected to said lever about an axis normal to the length of the lever and arranged to pivot in the same plane as said lever and the distal end of said brace including a covering of high friction material, whereby the distal end of the brace is applied to the rim of the wheel and the tool at the end of the lever adjacent the brace is applied to the tire and moved about the rim of the wheel.

7. The apparatus of claim 6 and wherein the end portions of said lever are formed at an angle with respect to the middle portion of the lever and the brace is connected to the lever at the intersection of one of the end portions and the middle portion.

8. The apparatus of claim 6 and wherein the tire dismounting tool at one end of the lever comprises a spade curved in a plane normal to the plane of the lever and a protrusion positioned on the convex surface of said spade, whereby the spaade is inserted into the tire and the protrusion engages the rim of the wheel to prevent the spade from slipping out of the tire.

9. Apparatus for mounting and dismounting tires on a spoked wheel including a base, a stanchion extending upwardly from said base, a support ring mounted on said stanchion in a horizontal attitude, and a plurality of hook members positioned about the support ring and extending upwardly from the support ring, each of said hook members including an upright section extending upwardly from said support ring and a horizontal section with horizontal section of each finger extending approximately in the same tangential direction about the support ring.

* * * * *